United States Patent
Tsyrganovich

[19]

[11] Patent Number: 5,995,164
[45] Date of Patent: Nov. 30, 1999

[54] REDUCTION OF COLOR TRANSITION DISTORTIONS IN NTSC/PAL ENCODER

[75] Inventor: Anatoliy V. Tsyrganovich, San Jose, Calif.

[73] Assignee: Zilog, Incorporated, Campbell, Calif.

[21] Appl. No.: 08/939,156

[22] Filed: Sep. 29, 1997

[51] Int. Cl.$^6$ ...................................................... H04N 9/64
[52] U.S. Cl. ........................... 348/649; 348/642; 348/654; 348/662
[58] Field of Search ..................................... 348/649, 651, 348/654, 652, 653, 642, 662, 703, 606, 607, 708, 713; 358/520; 382/167

[56] References Cited

U.S. PATENT DOCUMENTS 3,688,021  8/1972  Ekstrand .
4,714,954  12/1987  Yoshinaka et al. .
4,939,572  7/1990  Kosaka et al. .
5,786,865  7/1998  Ayenberg et al. .................. 348/642 X

OTHER PUBLICATIONS

"Nideo Demystified," Second Edition; Keith Jack; HighText Publications; San Diego, California; 19_.

Primary Examiner—John W. Miller
Attorney, Agent, or Firm—Majestic, Parsons, Siebert & Hsue P.C.

[57]   ABSTRACT

In a video encoder, the color distortion between pixels can be reduced by encoding the hue transition to limit very large hue (phase) transitions and encode a corresponding smaller phase transition. This produces fewer spurious colors between pixels during the encoding. This can be done by comparing the change in hue value to a reference value and adding or subtracting 2 π to this reference value to reduce the absolute value of a modified delta hue signal.

18 Claims, 4 Drawing Sheets

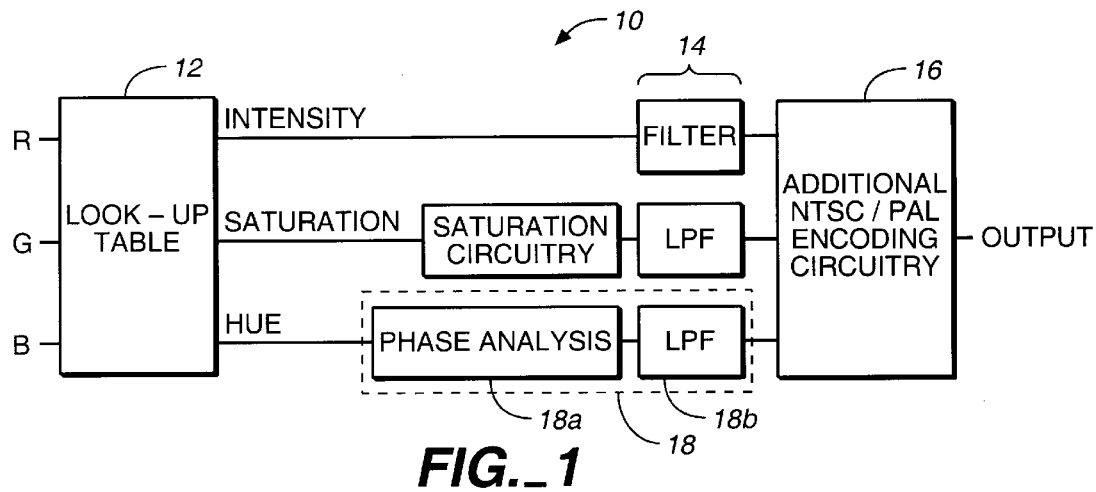
FIG._1
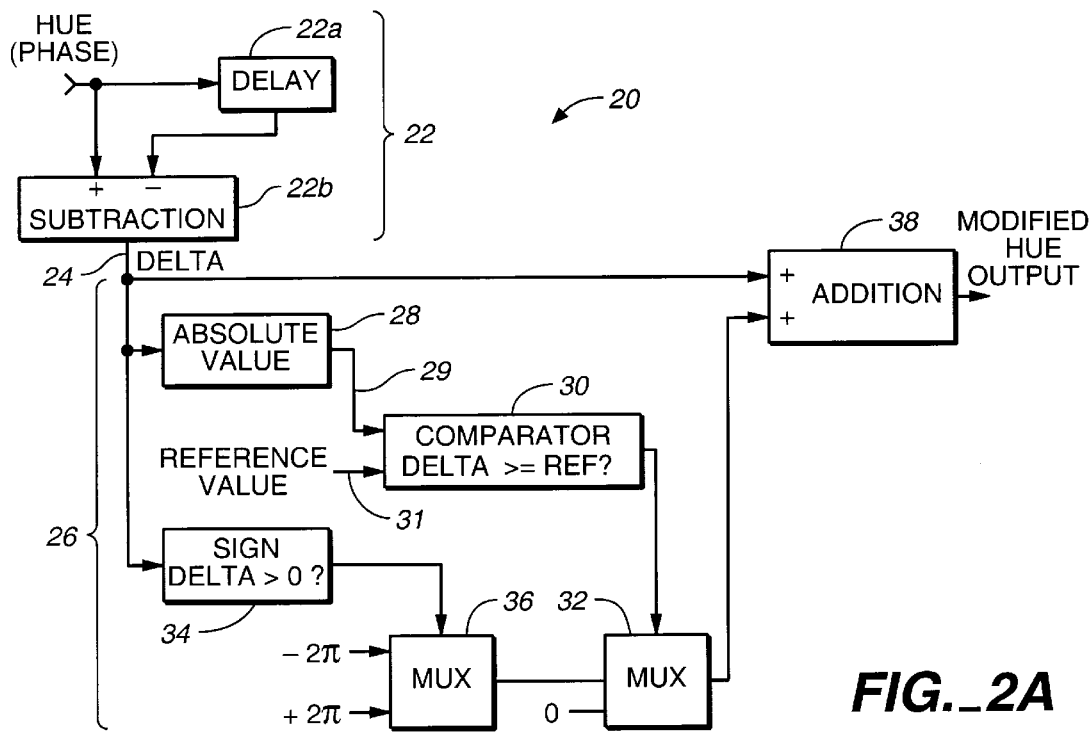
FIG._2A
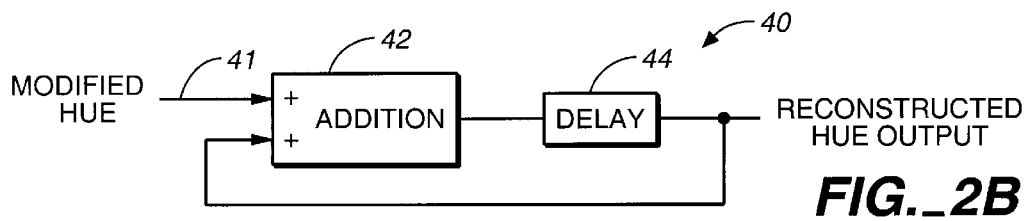
FIG._2B

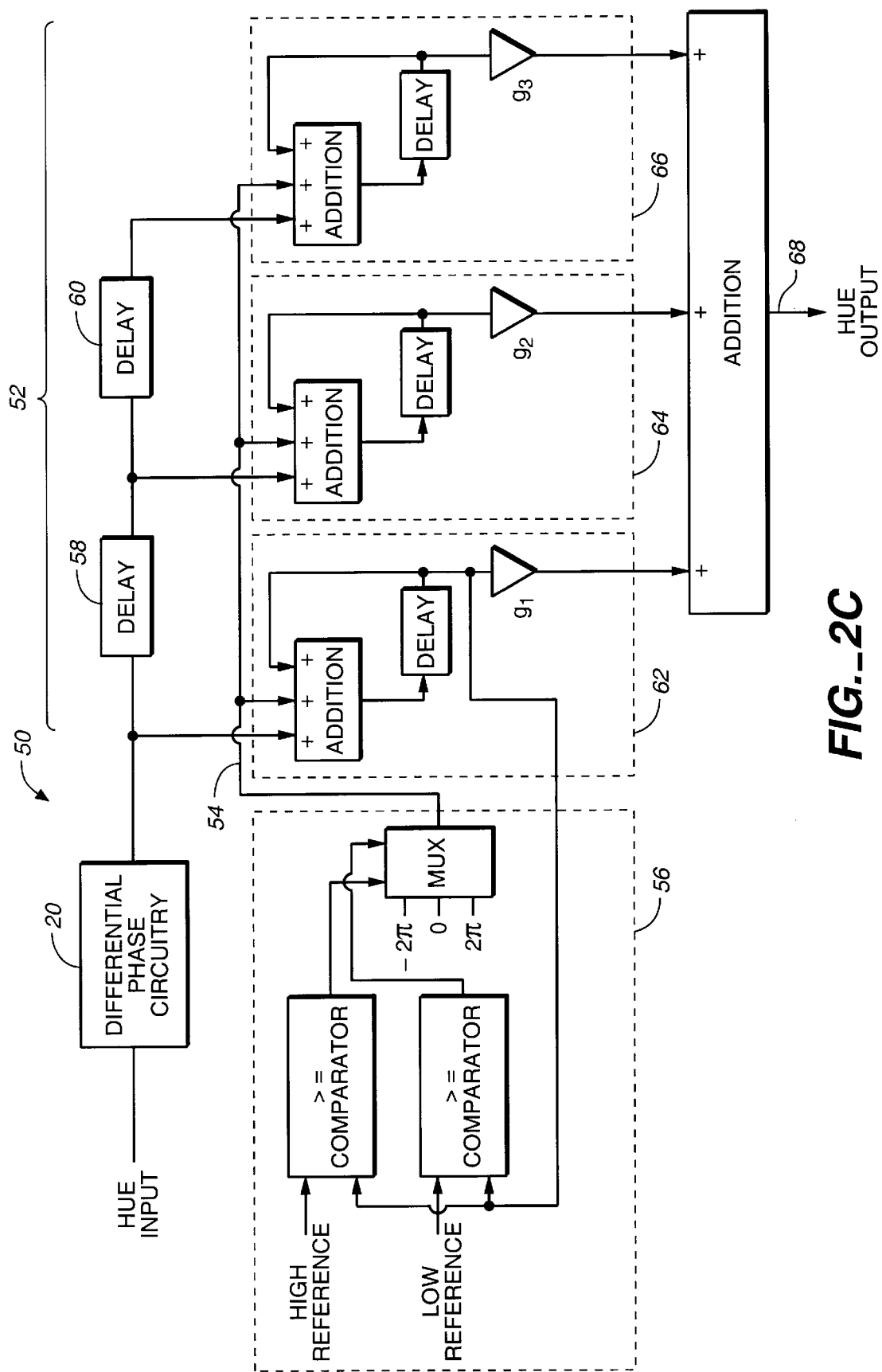
FIG._2C

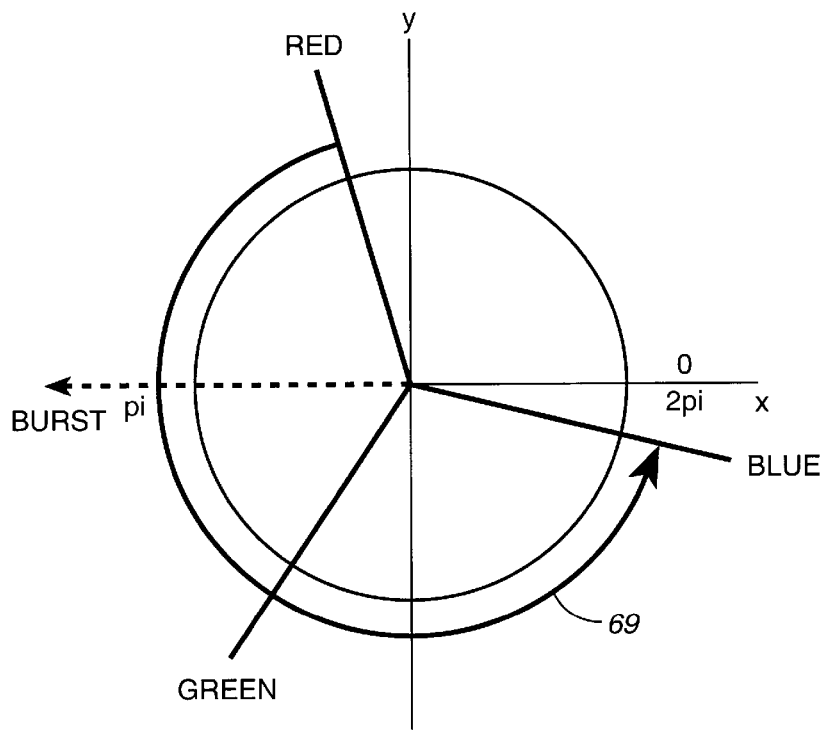
FIG._3
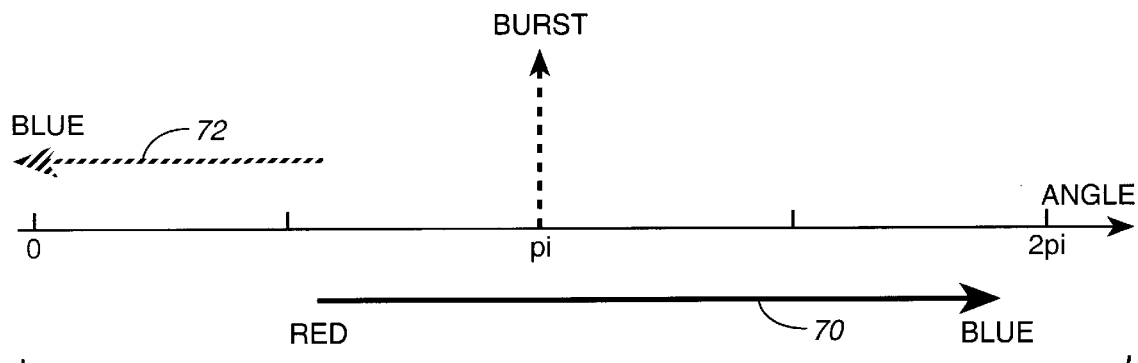
FIG._4

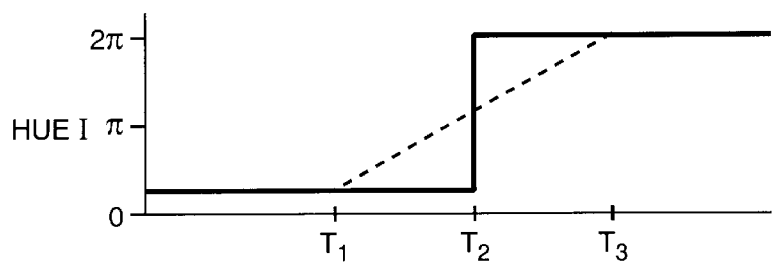
FIG._5A
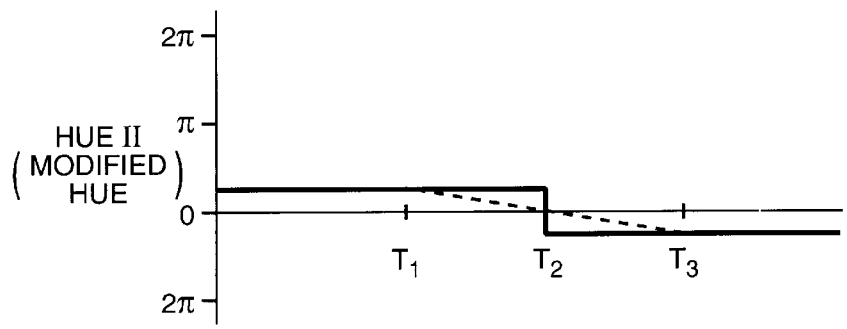
FIG._5B
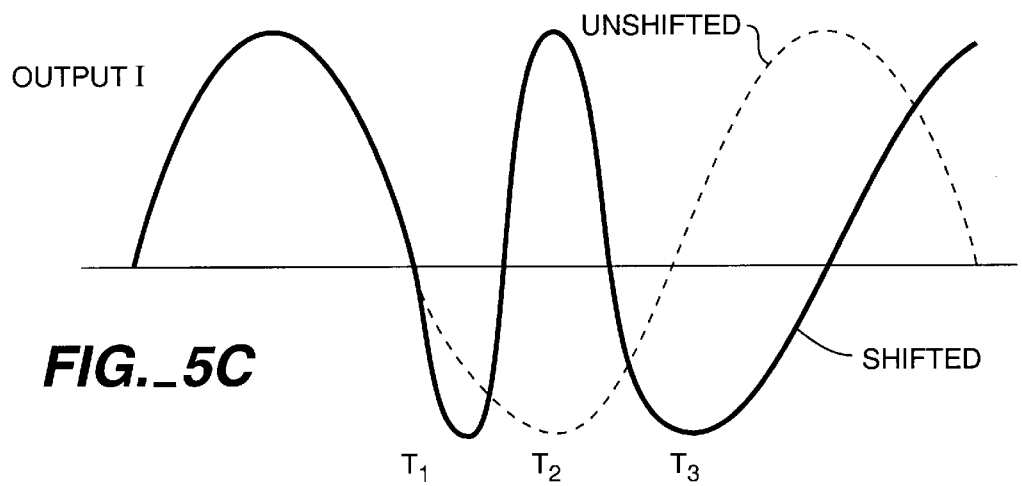
FIG._5C
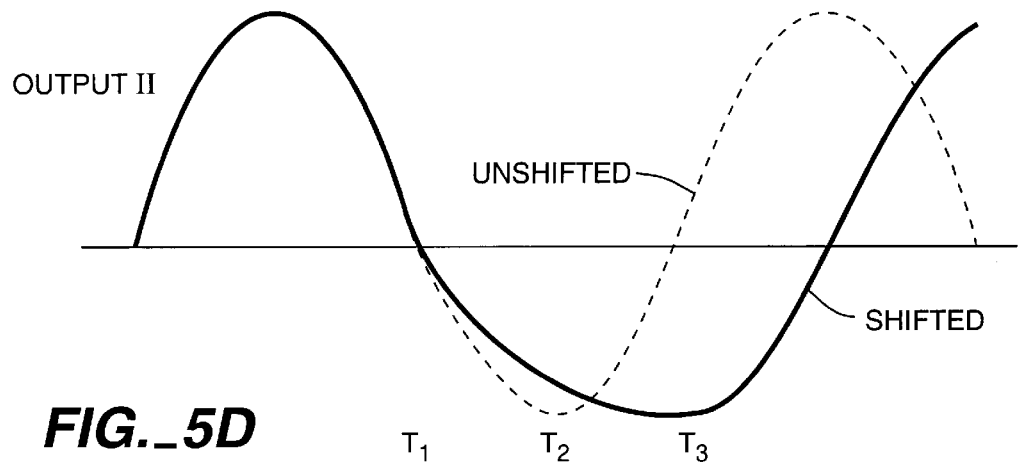
FIG._5D

REDUCTION OF COLOR TRANSITION DISTORTIONS IN NTSC/PAL ENCODER

BACKGROUND OF THE INVENTION

The present invention relates to a video signal encoder, especially a digital video signal encoder which encodes computer graphics.

The book "Video Demystified," Second Edition, by Keith Jack, incorporated herein by reference, describes the background for digital video encoding and decoding. On computers, color information pixels are typically stored in the red/green/blue (RGB) color space. For video encoding, the RGB data is converted into data including an intensity signal, and two chrominance signals. The intensity information is the equivalent of the black and white image of a television signal. In the YUV color space, "Y" stands for the intensity or luminance, and "U" and "V" contain the chrominance or color information. Another way of representing pixel data is in the Hue-Saturation-Intensity (HSI) color space. In this color space, the intensity corresponds to the black and white image; the hue, which is typically represented as a phase, indicates a color, such as red or blue; and the saturation indicates the level of the color, such as a pink versus a dark red. The most common television standards are the National Television Standards Committee (NTSC) standard used in the United States and the Phase Alternation Line (PAL) standard used in many European countries. In both of these standards, the chrominance information is encoded on a chrominance subcarrier. The hue is encoded as the phase of the chrominance subcarrier compared to the burst signal. The saturation is encoded as the amplitude of the chrominance subcarrier.

A problem that has been noted in the past is that of color distortion between two adjacent colors when phase (hue) and saturation encoding is used based on the HSI color space. This color distortion is caused by the change in the chrominance signal between the pixels. It is desired to provide an improved system which can reduce some of the color distortion between the video pixels.

SUMMARY OF THE INVENTION

The present invention is a new way to reduce color transition distortion. In this novel encoding method, very large hue (phase) changes are prevented between video pixel data. This system instead encodes both smaller phase transitions which correspond to the larger phase transition. For example, if the phase shifts from ¼π in to 7/4 π, this produces a 3/2 π phase transition. However, using the present invention, the phase can be shifted from ¼ π to −¼ π, producing a corresponding −½ π transition. In this manner, the phase shift will be shorter, and thus there will be fewer spurious colors produced at the decoding of the video signal. Note that the phase −¼ π is equivalent to the phase 7/4 π, so that the pixel values themselves are not changed. The phase shifts are, however, filtered as part of the encoding in order to keep the bandwidth of the chrominance data at acceptable levels. During the transition between the pixels, spurious colors are produced. By having a shorter phase transition, fewer of the spurious colors are produced and the spurious colors that are produced tend to be closer in color to the two pixels, and thus blend in with the two pixel colors better.

This invention is especially valuable for use with video encoding of computer graphics. A signal from a video camera will tend to have few large hue (phase) changes between pixels. Computer graphics, however, often have flat, ungraded colors with sharp color transitions at edges, and thus the spurious color problem is especially noticeable.

One way of reducing size of the phase transition is by modifying the hue signal. The modified hue signal can have a phase change that is offset 2 π from the original phase change of the hue signal. A video signal is then produced using the modified hue change.

In one embodiment, the hue change is compared to a reference value. If the hue change is greater than the reference value, then −2π is added to the signal to produce a modified hue change value. If the hue change is less than the negative reference value, then 2π is added to the hue change to produce the modified hue change. If the hue change is between the low reference value and the high reference value, no modification is made to the hue change.

In a preferred embodiment, the positive reference value is π and the negative reference value is −π so that the modified hue change has as small an absolute value as possible. Slightly larger reference values could also be used if desired. For example, the reference values can be 3/2 π and −3/2 π.

BRIEF DESCRIPTION OF THE DRAWINGS

The above and other features and aspects of the present invention will become more apparent upon reading the following detailed description in conjunction with the accompanying drawings, in which:

FIG. 1 is a diagram of a video encoder using the circuitry of the present invention;

FIG. 2A is a diagram of the differential phase circuit of the present invention;

FIG. 2B is a simple hue reconstruction circuit for use with the differential phase circuit of FIG. 2A;

FIG. 2C is a diagram of a filter and hue limiting circuit for use with the differential phase circuit of FIG. 2A;

FIG. 3 is a graph of a polar representation of a red and blue transition;

FIG. 4 is a graph of a one-dimensional representation of a red and blue transition;

FIG. 5A is a graph of a hue input signal showing the filtered hue in phantom;

FIG. 5B is a graph of a modified hue signal showing the filtered hue in tandem;

FIG. 5C is a graph of the chrominance subcarrier signal showing the phase change for the hue change of FIG. 5A; and FIG. 5D is a graph illustrating the chrominance subcarrier using the modified hue of FIG. 5B.

DETAILED DESCRIPTION OF THE PREFERRED EMBODIMENT

FIG. 1 is a diagram of the video encoder 10 embodying the device of the present invention. The encoder 10 uses a lookup table 12 to produce Intensity, Saturation and Hue values from the red/green/blue input. The stream of HSI data is filtered in filters 14 and then sent to the additional NTSC/PAL encoding circuitry. The NTSC/PAL encoding circuitry produces a chrominance subcarrier from the hue and saturation values and combines this with the intensity information to produce a video signal. The horizontal and vertical blanking audio, and other information can also be added to the video signal. The present invention concerns the phase circuitry 18 including the phase analysis circuitry 18a and low-pass filter 18b.

FIG. 2A is a diagram illustrating an embodiment of the differential phase circuit 20 of the present invention. The hue/phase input is sent into the delta circuitry 22 to produce a delta signal at line 24 equal to the change in phase between the pixel values. The hue is delayed in delay circuitry 22a, then subtracted from the current value of the hue in subtractor 22b to produce the delta hue value on line 24.

Circuitry 26 provides a modification to the delta hue value. Element 28 determines the absolute value of the delta hue. This absolute value on line 29 is compared to the reference value on line 31 inside the comparator 30. If the absolute value of the hue change is greater than the reference value, the comparator 30 instructs the multiplexer 32 to provide an offset to the delta hue value. This offset value is determined by the sign circuitry 34. If the sign of the delta hue on line 24 is positive, a −2 π signal is produced by the multiplexer 36. If the sign is less than zero, a 2 π signal is produced by the multiplexer 36. The adder circuitry 38 adds the output of multiplexer 32 to the delta value on line 24 to provide a modified delta hue output. Alternately, two different reference values could be used—a negative reference value and a positive reference value—having different absolute values.

In a preferred embodiment, the reference value on line 31 is π. Using π as the reference value will ensure that the absolute value of the modified hue change output will be as small possible. Alternately, a slightly larger reference value could be used. The slightly larger reference value would produce a modified hue output only when the change in the hue is sufficiently large.

The circuitry 20 is preferably implemented using digital logic. For example, the delay circuitry 22a can be a flip-flop.

FIG. 2B is a diagram of a simple hue reconstruction circuitry 40. The modified change in hue signal on line 41 from the output of circuitry 20 is sent to an adder 42 and delay element 44. The simple hue reconstruction circuitry 40 adds the change in the hue to the last value of the hue change to produce a reconstructed hue output. A disadvantage of using such a simple hue reconstruction circuitry is that the reconstructed hue output will have a large bit width. A large number of consecutive positive or negative transitions can be produced by the differential phase circuitry 20 of FIG. 2A. This would require a large number of bits for the reconstructed hue. This problem is avoided by using the circuitry of FIG. 2C. The circuitry of FIG. 2C is described in more detail in the co-pending patent application "Circle Correction in Digital Low-Pass Filter," by inventor Anatoliy Tsyrganovich, which is incorporated herein by reference. Also incorporated herein by reference is the co-pending application "Dot Crawl Reduction in NTSC/PAL Graphic Encoder" by inventor Anatoliy Tsyrganovich.

Looking at FIG. 2C, circuitry 50 uses special filter 52 which does not filter a correction signal on the line 54. The correction signal is produced by circuitry 56. The correction-producing circuitry 56 checks to see whether the hue value would be outside a predetermined bound. If so, a 2 π or −2 π correction signal is produced on line 54. Since this correction signal does not go through the delays 58 or 60, but goes directly to the coefficient circuitry 62, 64 and 66, this component of the output is not filtered. In this manner, the circuitry 50 produces the hue output at line 68, which includes an unfiltered correction portion which keeps the hue output within the desired bounds.

FIG. 3 is a graph of a phase transition curve illustrating the transition from a red pixel to a blue pixel shown in polar coordinates. Line 69 shows the direction of the prior art phase change. This prior art phase transition includes components that are incompatible with the pixel colors, such as green for a transition from red to blue.

FIG. 4 is a graph of a one-dimensional representation of the hue signal. Arrow 70 shows the old phase transition from red to blue. Arrow 72 is the smaller transition from red to blue, using the present invention. This smaller phase transition 72 will pass through colors that are more similar to the red and blue values. FIG. 5A is a graph of a hue change from hue ¼ π to a hue 7/4 π. This hue change has a value of 3/2 π. Shown in phantom is a filtered value for the hue. FIG. 5B illustrates the modified hue in which the hue transitions from ¼ π to −¼ π, for a total change of −½ π. FIG. 5C is a graph of the chrominance sub-carrier for the hue change of FIG. 5A. Shown in phantom is the unshifted value, which illustrates what would occur if there was no hue change. In the time period between $T_1$ and $T_3$, the phase of the chrominance subcarrier must make a 3/2 π change, producing a shifted signal as shown in FIG. 5C. FIG. 5D illustrates the chrominance subcarrier for the hue change shown in FIG. 5B. In the time period between $T_1$ and $T_3$, the phase of the chrominance subcarrier makes a smaller −½ π change. Fewer spurious phase "colors" are produced in the transition period between $T_1$ and $T_3$.

Various details of the implementation and method are merely illustrative of the invention. It will be understood that various changes in such details may be within the scope of the invention, which is to be limited only by the appended claims.

What is claimed is:

1. A method of processing data for video comprising:
   providing picture data including hue information encoded as a phase;
   producing a delta hue signal indicating the change in hue between pixels;
   using the delta hue signal to produce a modified delta hue signal, the modified delta hue signal being offset from the delta hue signal by 2 πn, where n is an integer; and
   producing a video signal using the modified delta hue signal.

2. The method of claim 1, wherein the using step includes comparing the absolute value of the delta hue signal to a reference value.

3. The method of claim 1, wherein the using step is such that if the delta hue signal is greater than a positive reference value then the modified delta hue signal is equal to the delta hue signal minus 2 π, if the delta hue signal is less than a negative reference value then the modified delta hue signal is equal to the delta hue signal plus 2 π, and if the delta hue signal is between the negative reference value and the positive reference value then the modified delta hue signal is equal to the delta hue signal.

4. The method of claim 3, wherein the using step is such that the positive reference value is π and the negative reference value is −π.

5. The method of claim 1, wherein the producing step includes using the modified delta hue signal to produce a modified hue signal.

6. The method of claim 5, wherein the producing step includes filtering the modified hue signal.

7. The method of claim 6, wherein the modified hue signal is constrained within a range.

8. The method of claim 7, wherein the filtering is such that adjustments to keep the modified hue signal within the range are not filtered.

9. The method of claim 8, wherein the adjustments are an integer multiple of 2 π.

10. An apparatus comprising:
    circuitry connected to receive hue information encoded as a phase and adapted to producing a delta hue signal indicating the change in hue between pixels;

circuitry connected to receive the delta hue signal and adapted to produce a modified delta hue signal, the modified delta hue signal being offset from the delta hue signal by $2\pi$, where n is an integer; and circuitry connected to receive the modified delta hue signal and adapted to produce a video signal.

11. The apparatus of claim 10, wherein the modified delta hue signal producing circuitry includes a comparitor input with the absolute value of the delta hue signal and a reference value.

12. The apparatus of claim 10, wherein the modified delta hue signal producing circuitry includes logic adapted to set the modified delta hue signal equal to the delta hue signal minus $2\pi$ if the delta hue signal is greater than a positive reference value, to set the modified delta hue signal equal to the delta hue signal plus $2\pi$ if the delta hue signal is less than a negative reference value, and to set the modified delta hue signal equal to the delta hue signal if the delta hue signal is between the negative reference value and the positive reference value.

13. The apparatus of claim 12, wherein the logic is such that the positive reference value is n and the negative reference value is $-\pi$.

14. The apparatus of claim 10, wherein the video signal producing circuitry is adapted to produce a modified hue signal using the modified delta hue signal.

15. The apparatus of claim 14, wherein the video signal producing circuitry includes a filter to filter the modified hue signal.

16. The apparatus of claim 15, wherein the video signal producing circuitry is such that the modified hue signal is constrained within a range.

17. The apparatus of claim 16, wherein the filter is such that adjustments to keep the modified hue signal within the range are not filtered.

18. The apparatus of claim 17, wherein the video signal producing circuitry is such that the adjustments are an integer multiple of $2\pi$.

\* \* \* \* \*